April 28, 1925.

E. MONACELLI ET AL 1,535,129

FILM SPLICING APPARATUS

Filed Nov. 18, 1922      3 Sheets-Sheet 1

INVENTORS
Emidio Monacelli
Americo Pagnanelli
BY William F. Nickel
THEIR ATTORNEY

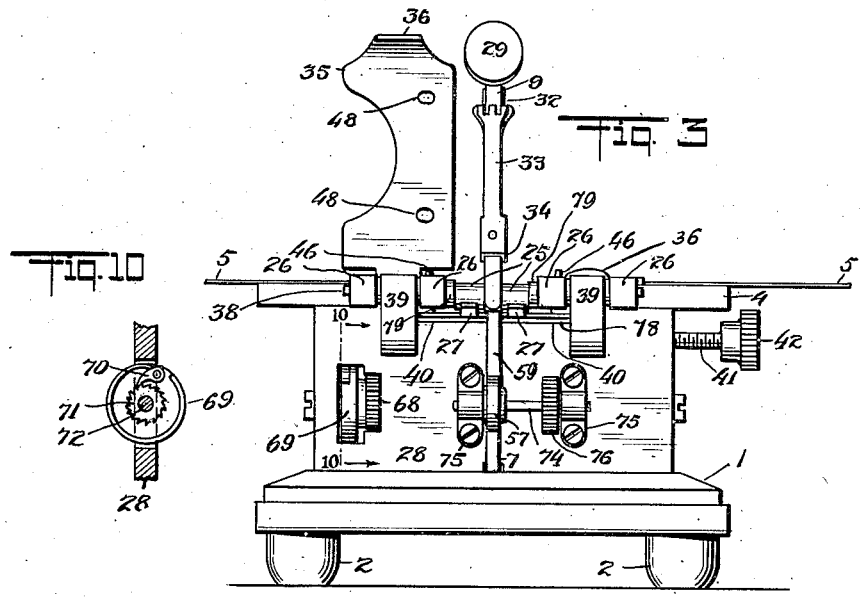

April 28, 1925.
E. MONACELLI ET AL
1,535,129
FILM SPLICING APPARATUS
Filed Nov. 18, 1922
3 Sheets-Sheet 3
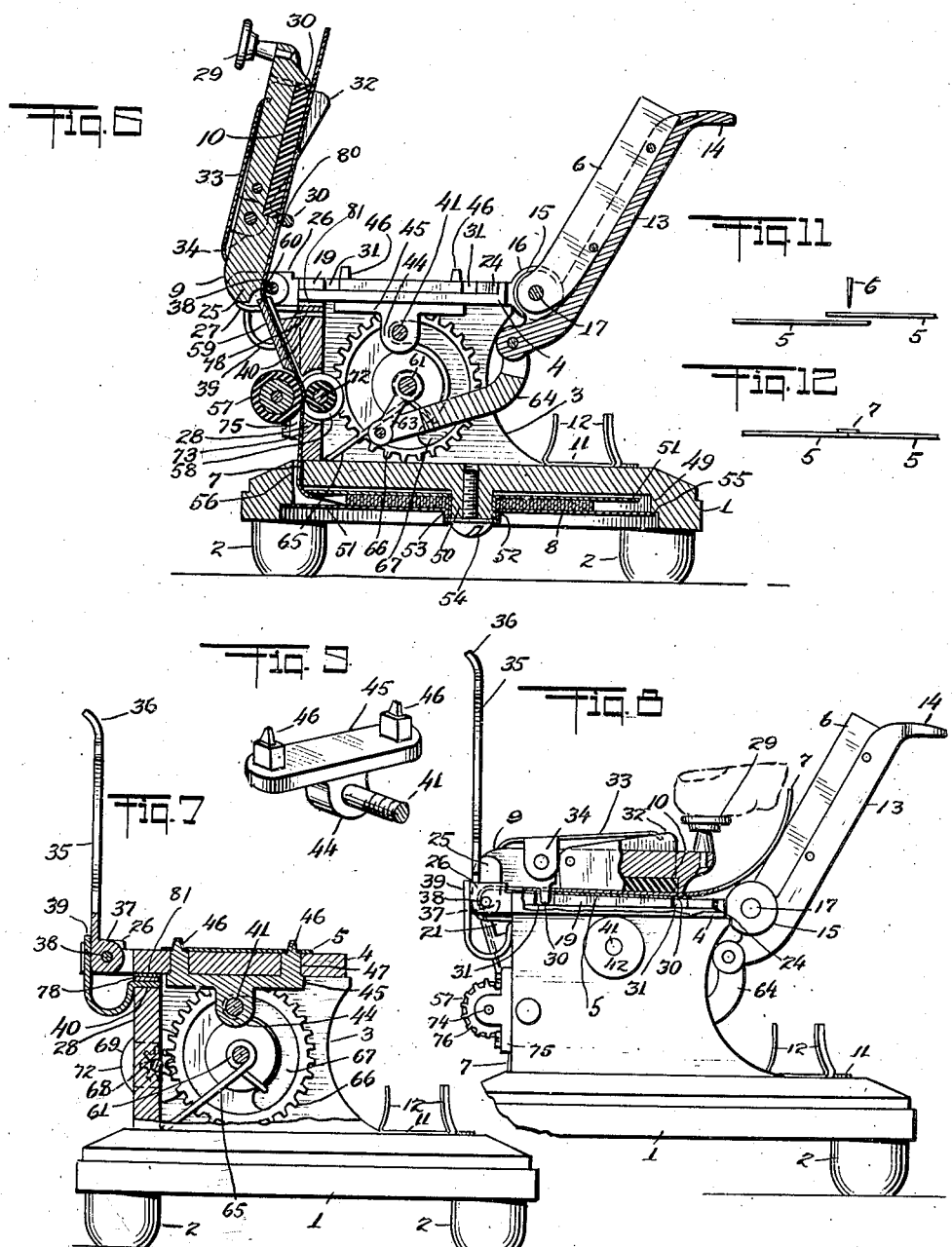
INVENTORS.
Emidio Monacelli
Americo Pagnanelli
BY William F. Nickel
THEIR ATTORNEY Patented Apr. 28, 1925.

1,535,129

UNITED STATES PATENT OFFICE.

EMIDIO MONACELLI AND AMERICO PAGNANELLI, OF NEW YORK, N. Y.

FILM-SPLICING APPARATUS.

Application filed November 18, 1922. Serial No. 601,714.

*To all whom it may concern:*

Be it known that we, EMIDIO MONACELLI and AMERICO PAGNANELLI, subjects of the King of Italy, residing in New York, in the county of Bronx and State of New York, have invented certain new and useful Improvements in Film-Splicing Apparatus, of which the following is a specification.

Our invention relates to apparatus for splicing motion picture films when such films have been torn or broken, or lengths thereof are to be united for the assembly of scenes or parts of motion picture films.

To use apparatus according to our invention, the operator places both ends of the film to be joined or spliced on the top of the apparatus, with the frame lines (boundary lines of each individual image) overlapping and with the celluloid or glossy sides uppermost. A knife mounted on the apparatus is then pushed forward and downward cutting or trimming both ends of the film simultaneously on the frame lines and at the same time a sufficient portion of the patching strip from a roll underneath the apparatus is fed into a pressing bar. After cement (liquid film) has been applied to the two ends of the cut film, the pressing bar is brought down and automatically places the patching strip in its proper place, cuts it off to the required size and makes the patch complete.

Among the advantages of this machine over those in use at the present time are:— scissors are not necessary to cut each end of the film separately. It is not necessary to wet and scrape off the emulsion from a part of the film beyond the frame line. Therefore an operator can make a patch in one fourth of the time usually required.

Other objects and advantages of our invention are fully set forth in the following description, taken in connection with the accompanying drawings: upon which the preferred embodiment of our invention is illustrated. This disclosure, however, is explanatory only, and we may make changes within the nature and scope of the invention to the full extent indicated by the broad and general meanings of the terms in which the appended claims are expressed.

On the drawings:

Figure 3 is a back view of same;

Figure 4 is a side elevation seen from the left;

Figure 1:
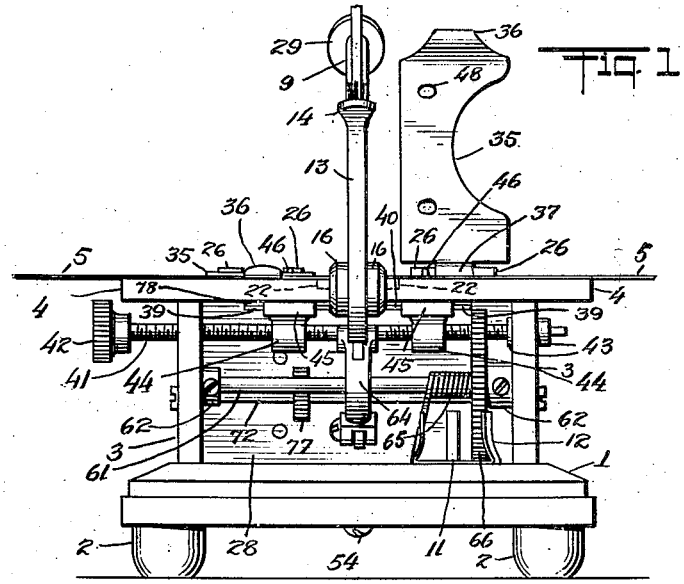
Figure 1 is a front view of a film-splicing apparatus according to our invention.
Figure 2:
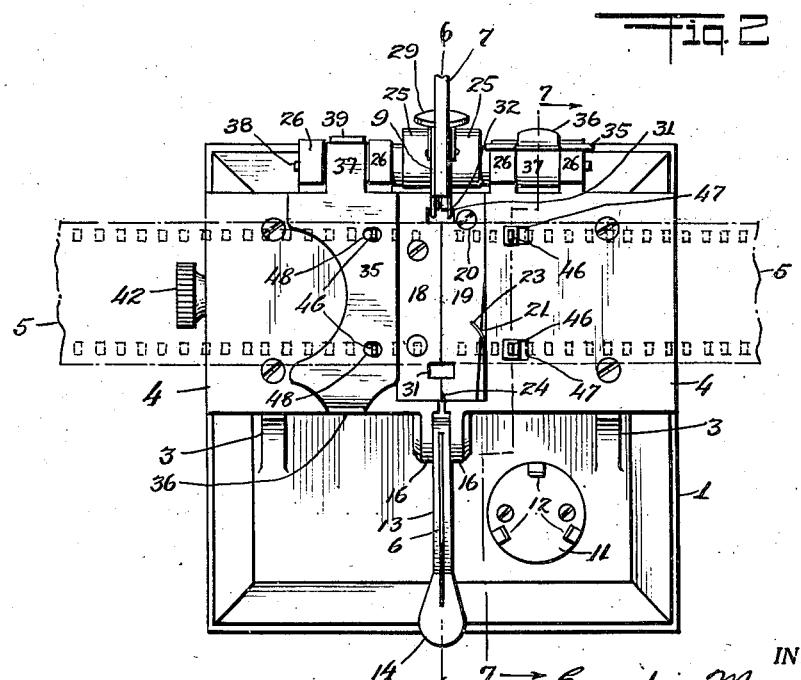
Figure 2 is a top view thereof.

Figure 5, a bottom plan;

Figure 6, a section on the line 6—6 of Figure 2;

Figure 7, a section on the line 7—7 of Figure 2;

Figure 8 is a view similar to Figure 4, showing the parts in different position;

Figure 9 is a perspective view of a detail;

Figure 10 shows a ratchet and pawl included in the mechanism for operating the apparatus; this view being on line 10—10 of Figure 3;

Figure 11 is a detail view showing the ends of two pieces of film laid one upon the other in readiness to be trimmed preparatory to splicing; and Figure 12 shows the same pieces of film after trimming and when the splicing operation is completed.

The same numerals identify the same parts throughout.

In the particular description of the drawings numeral 1 indicates a base provided with feet 2 to enable it to be set upon a table or work bench; and extending from the top of the base are uprights or standards 3 at each side. To the top of each of these uprights is fastened a plate 4, these plates being at the same level above the base and extending towards each other to afford a platform upon which the pieces of film 5 that are to be mended can rest. The plates 4 are held upon the uprights 3 by means of screws or in any other way, and their adjacent ends need not abut but are preferably separated by a small space above the middle of the base 1. When a film has been torn crosswise and is to be spliced, the divided ends are laid upon the plates 4, one end overlapping the other; and trimmed by means of a knife 6 which can be pressed down upon the ends of the film and pass between the plates 4. The two rough edges are thus trimmed off, so that smooth ends are made, and those ends will now abut each other. Then the tops of the two pieces of film along the abutting edges of the two ends are given a coating of cement or other adhesive; and a splicing strip 7 of celluloid or other suitable material is laid upon the abutting ends and pressed down to engage the adhesive and become attached to the two ends to hold the ends together. See Figures 11 and 12. This strip is supplied from a reel 8 on the bottom of the base 1; and to make the strip stick, a bar 9 is adapted to be pushed down and pressed upon the splicing strip 7 over the entire width of the film. To enable such pressure to be uniform, the bar may carry a cushion 10, of rubber or felt or the like, in its lower edge. To the top of the base in front of the platform comprising the plates 4, and preferably to one side, we may fix a disk 11 having a number of upstanding, slightly converging, spring fingers 12, within their ends turned outward, to receive a glue bottle; so that when the bottle is thrust down between the fingers 12, until its bottom rests upon the disk 11, it will be held fast and the operator can always easily apply the adhesive by dipping a brush into the bottle and drawing the brush over the abutting ends of the two pieces of the film 5, after the trimming has been done as above described.

We shall now first describe the manner in which the knife blade 6 is mounted and operated. This blade is secured to a lever 13 by making a slot in the lever and inserting the back of the blade into the slot; rivets or other fastening devices being employed, if desired, to hold the blade. The free end of the lever will have a handle 14, and at the opposite end will be a bearing 15, to fit between bearings 16 projecting from the front edges of the plates 4 at the adjacent ends of these plates; and a pivot pin 17 engaging the bearings 15 and 16 secures the lever in position and enables it to be moved up and down. One of the plates 4 will carry a fixed strip 18 in its top and the other a pivoted strip 19, the two strips 18 and 19 being flush with the upper surface of the plates 4 and being located at the adjacent end of these plates. The strip 19 will be secured by a pivot 20 and a spring 21 will normally actuate this strip 19 so as to move it over into contact along one entire edge with the strip 18. To receive these strips the upper faces of the plates 4 are preferably cut out or recessed at their adjacent ends to a depth equal to the thickness of the strips and in the spaces thus provided the strips 18 and 19 are placed. The fixed strip 18 substantially fills the space cut out to receive it and is flush with the edge of the plate carrying it; while the pivoted strip 19 may move to some extent about its pivot 20 between the adjacent edge of the strip 18 and a shoulder 22 in the top plate 4 to which it is attached. The spring 21 engages this shoulder and enters a recess 23 in the adjacent side of the strip 19. This spring acts to force the two strips 18 and 19 together and thus makes the strip 19 slightly overlap along one edge the space between the plates 4. One corner of the strip 19 on the side adjacent the strip 18, at the end which is nearest to the pivot pin 17 is cut away, as indicated at 24, to form a guide-way for the knife blade 6, when it is lowered to a sufficient extent to enter the space between this cut-away corner and the end of the strip 18 opposite. Hence, when the lever is depressed to make the knife 6 trim the ends of the pieces of film 5, the strip 19 is moved back just enough by the sides of the knife, to give passage to the knife blade between the strips 18 and 19, and a good shearing cut is therefore permitted to enable the ends of the film to be trimmed neatly.

The presser bar 9 has a pair of separated lugs constituting bearings 25 to co-operate with bearings 26, one of which extends from the rear of each top plate 4 adjacent the middle of the platform; so that this presser bar can be mounted in central position in line with the space which separates the plates and opposite the knife blade 6. The top or back of the bar 9 and the rear faces of the lugs 25 present well defined corners to be engaged by spring resilient arms 27, while the lower ends of these lugs 25 are rounded off. The arms 27 are mounted in the back 28, which extends between the uprights 3, and the arms are supported by this back at the proper height. Hence, when the bar is raised, the arms 27 engaging the flat rear faces of the lugs 25, will hold it up; and when it is moved downward these arms will make contact with the rounded ends of the lugs 25, and enable the bar to be depressed by the use of a little force until it occupies a horizontal position and extends across the platform from back to front. At the free end this presser bar has a knob 29; and on its lower edge, and as far apart as the width of the film to be spliced, are projections 30 having ends providing a pair of shear points to enable the splicing strip 7 to be cut off at the opposite edges of the film. The cushion 10 is between the projections 30; and the strips 18 and 19 will be provided in their contact edges with registering recesses 31, forming apertures so that the shear points can pass below the upper surfaces of the plates 4 and sever the splicing strip as the cushion 10 presses this splicing strip down upon the adhesive with which the ends of the pieces of film 5 are coated. The bar 9 will have at each side a pivoted plate 32, the free ends of which are adjacent the knob 29; and a spring 33 having lugs 34 may be attached to that bar 9 to constrain the free ends of these plates to extend beyond the sides of the cushion 10. The lugs or ears 34 engage the sides of the bar and receive a rivet to hold the spring 33 on the bar. The extremity of the spring 33 which engages the edges of the plate 32 may be split in three places, as indicated in Figure 3; so that the outside points of this end of the spring can engage the edges of the plate 32 most advantageously. When these plates are held by the spring 33 so that their upper edges are flush with the back of the bar 9, and their lower edges project beyond the cushion 10, these plates form a guide-way through which the splicing strip 7 can travel as it is fed from the reel 8 for one operation after another. When this bar is depressed, the lower edges of the plates 32, are stopped by the top faces of the two pieces of film; and as the bar moves down farther to make the cushion 10 press the splicing strip 7 against the adhesive on the ends of the film, the spring 33 yields so that the plates 32 do not move any further; but simply rest on the ends, holding them flat and fast as the cushion presses down the strip 7.

To secure the pieces of film to be spliced on the platform consisting of the plates 4, the apparatus is provided with two clamps 35 each of which has a projection 36 in front to be grasped for raising or lowering by the thumb and finger. At their rear edges these clamps 35 have bearings 37, which project from the lower faces of the clamps, and the rear faces of these bearings make a well-defined corner with the tops of the clamps. We insert each bearing 27 between one of the bearings 26 already mentioned and an extra bearing 26 on each plate 4, near the middle of the rear edge, and through all four bearings 26 the same pivot pin 38 may pass for both the bar 9 and the clamps 35. Up-turned springs 39 rest against the rear faces of the bearings 37 to hold the clamps firmly down on the film when they are lowered, and to engage the tops or backs of the clamps beyond the corners when these clamps are lifted, and keep them raised. The ends of these springs 39 too may be rigid with the back 28. For this purpose the top edge of the back may have a recess 40 to receive the fixed ends of the springs 39, between the bottom of this recess and the lower faces of the plates 4. We also provide a rod 41 engaging bearings in the standards 3, and provided on the outer face of the standard 3 at the left with a milled head 42 to enable it to be turned. At its opposite end this rod has fixed collars 43 engaging the faces of the other upright 3, so that the rod cannot be moved longitudinally between the uprights 3. Between the standards 3, the rod is threaded to engage threaded bearings 44 rigid with adjusting heads 45 located below the plates 4, each head having two teeth 46 which pass up through openings 47 in the plates 4 and can enter openings 48 in the clamps 45. The teeth 46 terminate in points which can enter any of the usual openings along the edges of the film; and the heads 45 are made adjustable so that when a film is to be spliced the teeth 46 can actuate the two pieces of film into required position. Of course, the openings 47 and 48 will be elongated somewhat in the direction of the width of the apparatus to enable the teeth 46 to be moved towards or from the strips 18 and 19.

The base 1 has a chamber 49 in its lower face and at the middle of the chamber is a boss or journal 50 having a threaded opening to receive a retaining screw. Into this chamber we place the reel 8, which may consist of an upper disk 51 having a central hollow boss 52 and a lower disk 51 having a central opening surrounded by a rim or flange 53 to receive the boss 52. The splicing-strip 7 is wound around the boss 52 between the disks and the reel can be disposed in the chamber 49 so that the boss 50 will pass through the boss or hub 52 and enable the reel to be turned, a screw 54 having a head being used to enter the boss 50 and engage the reel so that the reel will be kept on the journal or pivot 50. The chamber 49 may be circular or otherwise shaped, and the mouth thereby may be enlarged to provide a shoulder 55. Preferably the lower disk 51 will be larger than the upper disk so as to engage this shoulder, and close the chamber. From the reel the strip will pass through an aperture 56 in the base and up along the back 28 between a feed roll 57 and a flanged guide roll 58, through a guide-way 59, and then up between the lugs 25 and pivot pin 38 along the lower side of the bar 9 and cushion 10 between the guide plates 32. The space between the pivot pin 38 and the rear end of the bar 9 giving passage to the strip is indicated by the numeral 60.

Parallel with the threaded rod 41 is a shaft 61 engaging bearings in the standards or sides 3 and held against endwise movement by rigid collars 62. Fixed to this shaft is rigid arm 63, connected by a link 64 to the lower end of the lever 13; and a spring 65 encircles the shaft 61 and has one end anchored on the base 1. Adjacent the right side 3 the shaft 61 carries a fixed gear 66, having a curved slot 67 therein to give passage to the rod 41 and enable the gear to be turned through a given angle. The other end of the spring 65 may engage the end of this slot so that after the gear has been moved the spring will turn it back to its starting point. This gear will mesh with a pinion 68 rigid with a drum 69 bearing a pawl 70, and this pawl will engage with a ratchet 71 on a spindle 72 parallel with the shaft 61 and shown as turning in a recess or bore in the back 28, this recess being indicated at 73. Of course the pinion 68 and drum 69 are loose on the shaft.

Hence, when the knife is moved down to trim the two pieces of film to be spliced, the gear 66 will turn the pinion 67 and through the ratchet and pawl will actuate the spindle 72. The spindle 72 has rigid thereon the flanged guide and feed roll 58 and the back 28 is recessed as shown at 73 to allow this guide roll to project through it into engagement with the feed roll 57.

On the outside of the back 28 is another short spindle 74 mounted in bearings 75, attached to the back; and this spindle will have a fixed gear 76 meshing with a fixed gear 77 on the spindle 72, the back being again recessed to allow these gears 76 and 77 to mesh with each other. This spindle 74 carries rigid thereon the feed roll 57.

Hence, to operate the apparatus, the attendant takes the two portions of film that have to be joined and lays them on the plates 4 so that their ends overlap, in approximately correct position, and with the teeth 46 on both sides of the strips 18 and 19 in engagement with the holes along the opposite longitudinal edges of the film. In making a butt splice the two pieces of the film must be disposed on the plates 4 so that their ends will overlap far enough to have the side of the first undamaged picture on one piece directly over the side or end of the first undamaged picture on the other piece; and the lines along the meeting edges of the two pictures must coincide with the contacting edges of the strips 18 and 19. To this end the head 42 is turned to move the heads 45 and make the teeth 46 adjust the two pieces of film into the exact necessary relation.

When the two pieces of film are right, the clamps 35 being down, then the lever 13 is depressed to trim the ends of the pieces of the film. The movement of the lever 13 acts through the link 64 and arm 63 to turn the shaft 61 and gear 66; so that through the pinion 68, the spindle 72 is rotated. Hence, the two rolls 57 and 58 are turned to pass the splicing strip 7 through the guideway 59 and space 60 along the lower side of the cushion 10, between the guide plates 32. When the knife has finished cutting and trimming the film the splicing strip will be a little beyond the forward end of the cushion 10, adjacent the knob 29. After the handle 14 is released the spring 65 returns the lever 13 and gear 66, but, on account of the pawl and ratchet, without turning back the spindle 72. The operator then applies some glue to the top surface of the two pieces of film along their trimmed edges and presses down the lever 9. This lever lays the portion or length of the splicing strip 7 along the lower face of the cushion 10, down upon the coating of adhesive, so that the opposite edges of the strip 7 engage the two edges along the ends of the two pieces of the film. The plates 32 hold the extremities between the clamps 35 perfectly flat, while the cushion 10 compels the splicing strip to make contact with the adhesive over the whole width of the film, and presses the strip 7 into complete and uniform engagement with the two ends. Further pressure on the bar 9 makes the shear points 30 enter the recesses 31 and cut off the splicing strip at the opposite longitudinal edges of the film so that the ends of this strip do not project. Then the bar 9 is lifted and as soon as the adhesive has dried the film can be removed. Of course the two pieces of film must have the proper faces uppermost when laid on the plates 4.

The resilient arms 27 may be separate parts, but are shown as integral with a leaf spring 78, laid in the recess 40, and having the arms projecting from one side. The fixed ends of the springs 39 are under the ends of this leaf, and the plates 4 hold them all in place in the recess 40. Washers 79 on the pin 38 may be between the lugs 25 and bearings 76 if needed.

The projection 30 nearest the pivot of the bar 9 is recessed as at 80 in Figure 6, to let the strip 7 pass through it.

The practical value of our apparatus may be judged from the fact that for a lap-splice the film must not only be cut but also cleaned along one of the ends. Also, for a bevel splice, the ends after trimming must be scraped as well. In the practice of our invention, the necessity for cleaning and scraping is obviated, and the use of the adhesive and the strip 7, which is transparent, firmly unites the pieces without leaving any gap in the series of pictures and without decreasing the passage of light from the projector when the film is again exhibited.

Shims 81 shown in Figures 6 and 7 are between the plates 4 in the ends of the leaf spring 78 to hold the leaf 78 tightly, if required.

Having described our invention, what we believe to be new and desire to secure and protect by Letters Patent of the United States is:

1. A film-splicing apparatus comprising a platform, a trimming blade, and a pair of strips on the top of the platform in position to receive the blade between them, said strips being relatively movable into contact with each other and separable to admit the edge of said blade.

2. A film-splicing apparatus comprising a presser bar having movable guide plates secured to its sides and projecting below the lower face of same.

3. A film-splicing apparatus comprising a presser bar having movable guide plates secured to its sides and extending beyond its lower face and projections forming shear points on the lower face of the bar, one of said projections being apertured to give passage to a splicing strip between said plates.

4. A film-splicing apparatus comprising a reel to carry a splicing strip wound thereon, a presser bar pivoted adjacent one end, and a guide adjacent the pivoted end of said bar to direct the strip to the lower face of the bar to enable the bar to attach it to the ends of pieces of film to be connected.

5. A film-splicing apparatus comprising a platform, clamps to secure pieces of film to be united on the top of the platform, a lever bearing a blade to trim the ends of said pieces, a gear operated by the lever, feed rolls to engage a splicing strip actuated in one direction by the gear, a presser bar, and a guide-way to direct the strip to the lower face of the bar, when said feed rolls are operated.

6. A film-splicing apparatus comprising a platform, clamps to secure pieces of film to be united on the top of the platform, a lever bearing a blade to trim the ends of said pieces, a gear operated by the lever, feed rolls to engage a splicing strip actuated in one direction by the gear, a presser bar, movable guide plates secured to the sides of the bar, and a guide-way to direct the strip between said guide-plates, when said feed rolls are operated.

7. A film-splicing apparatus comprising a lever bearing a blade to trim the ends of pieces of film to be spliced, a gear operated by the lever, feed rolls to engage a splicing strip, connections between the gear and the rolls to enable the rolls to be actuated only when the lever moves the blade to trim said pieces, a presser bar, and a guide-way to direct the strip to the presser bar when said feed rolls are rotated.

8. A film-splicing apparatus comprising a lever bearing a blade to trim the ends of pieces of film to be spliced, a gear operated by the lever, feed rolls to engage a splicing strip, connections between the gear and the rolls to enable the rolls to be actuated only when the lever moves the blade to trim said pieces, a presser bar, movable guide plates secured to the sides of the bar, and a guide-way to direct the strip between the guide-plates on said bar.

9. A film-splicing apparatus comprising a reel to carry a splicing strip thereon, a lever bearing a trimming blade, connections including a pawl and ratchet to move the reel and unwind the strip when the lever makes its trimming movement only, and a spring to return said lever to starting position.

In testimony whereof, we have signed our names to this specification this 8th day of November, 1922.

EMIDIO MONACELLI.
AMERICO PAGNANELLI.